Jan. 9, 1934.  H. SCHWARTZ  1,942,666
APPARATUS FOR FORMING BUSHING STRUCTURES
Filed March 15, 1928   7 Sheets-Sheet 3

Inventor:
Henry Schwartz,
By Jones, Addington,
Ames & Seibold
Attys.

Jan. 9, 1934.                 H. SCHWARTZ                1,942,666
                APPARATUS FOR FORMING BUSHING STRUCTURES
                    Filed March 15, 1928        7 Sheets-Sheet 5

Inventor:
Henry Schwartz,
By Jones, Addington, Ames & Seibold
                            Attys.

Jan. 9, 1934.  H. SCHWARTZ  1,942,666
APPARATUS FOR FORMING BUSHING STRUCTURES
Filed March 15, 1928  7 Sheets-Sheet 6

Inventor:
Henry Schwartz,
By Jones, Addington, Ames & Seibold
Attys.

Jan. 9, 1934.   H. SCHWARTZ   1,942,666
APPARATUS FOR FORMING BUSHING STRUCTURES
Filed March 15, 1928   7 Sheets-Sheet 7

Inventor
Henry Schwartz,
By Jones, Addington, Ames & Seibold
Attys.

Patented Jan. 9, 1934

1,942,666

UNITED STATES PATENT OFFICE 1,942,666

APPARATUS FOR FORMING BUSHING STRUCTURES

Henry Schwartz, Chicago, Ill., assignor to Barrel Fitting and Seal Corporation of America, Chicago, Ill., a corporation of Illinois Application March 15, 1928. Serial No. 261,781

11 Claims. (Cl. 153—12)

This application relates to an apparatus for forming a bushing structure and has special reference to an apparatus for forming bushing structures such as are employed on metallic barrels and other containers which latter are used for storing and shipping liquids or semi-liquids.

More particularly, this invention relates to a punch and die construction for forming a collar and for providing a surplus of material such as an annular bead or corrugation on a supporting wall of a metallic barrel or other container and in forming the sides of the collar against a bushing to straighten out the corrugation and to contract the collar to fit snugly against the bushing. The particular construction of the apparatus of this invention is directed to a plurality of segmental (when viewed in plan) jaw members pivotally mounted on a supporting portion of a die, the jaw members having engaging faces for forming the sides of a collar in a supporting wall of a container against an internally threaded bushing for receiving the bung when operated upon by a punch member cooperating with the die member in order to provide a snug and air-tight engagement between the collar and the bushing.

In the present invention, it is contemplated to provide a punch and die mechanism such as is mentioned above which will minimize the number of operations necessary to form a desirable bushing structure and will, therefore, minimize the cost of the production thereof.

It is further contemplated to provide an apparatus of the above noted type which will operate satisfactorily on a material of an inferior quality to produce a desirable bushing structure at a minimum of expense. Again, because of the nature of the operation of the apparatus, the inventive genius has been employed in providing a maximum of durability in the apparatus, the operating members being so constructed and arranged as to minimize wear and the possibility of breakage.

The device of this invention has been so constructed and arranged as to provide for an interchangeability of the operating parts or those parts subjected to the greatest strain. Therefore, one or two segmental jaw members may be held in reserve to replace any one of the segmental jaw members which have become worn or broken. The arrangement of the parts of this construction is such that it is necessary but to remove a single securing ring to make the replacement.

It will be particularly noted that the present mechanism minimizes the number of operations required to form a bushing structure. As far as is known to this applicant, at least three or four operations have been required on similar mechanisms which produces a greater strain on the material. The present invention minimizes or obviates the crystallization of the material operated on. Also, it is apparent that the more presses to be operated, the more men need be employed.

Further objects of this invention will be apparent from the description and drawings forming a part of this specification to which latter reference may now be had for a more complete understanding of the characteristic features of this invention, in which drawings.

Referring now to the drawings and more particularly to Figs. 1 to 6, inclusive, thereof, the punch and die mechanism illustrated therein comprises a punch holder 15 having a punch 16 preferably secured in a recess in the underneath side thereof by means such as screws 17. A preferably octagonally shaped recess 18 is centrally formed in the punch member 16 at the lower end thereof and communicates with a substantially larger and preferably annular opening 19, the juncture between the apertures 18 and 19 forming a shoulder for engaging a head portion 20 of a cutter 21 and securing the latter in a fixed relation with the punch and punch holder 16 and 15, respectively. The cutter 21 is preferably annular and substantially smaller in diameter than the diameter of the octagonally shaped aperture 18 at the smallest portion thereof. A knock-out ring 22 of an octagonally shaped peripheral contour is loosely and slidably disposed in the recess formed by the aperture 18 about the cutter 21. For reasons, which will hereinafter be more fully explained, the upper end of the knock-out ring 22 is spaced a predetermined distance from the head 20 of the cutter 21 and is held in that predetermined relation normally by means of screws 23, the heads of the latter being countersunk a substantial distance into the head 20 of the cutter 21.

Figure 1:
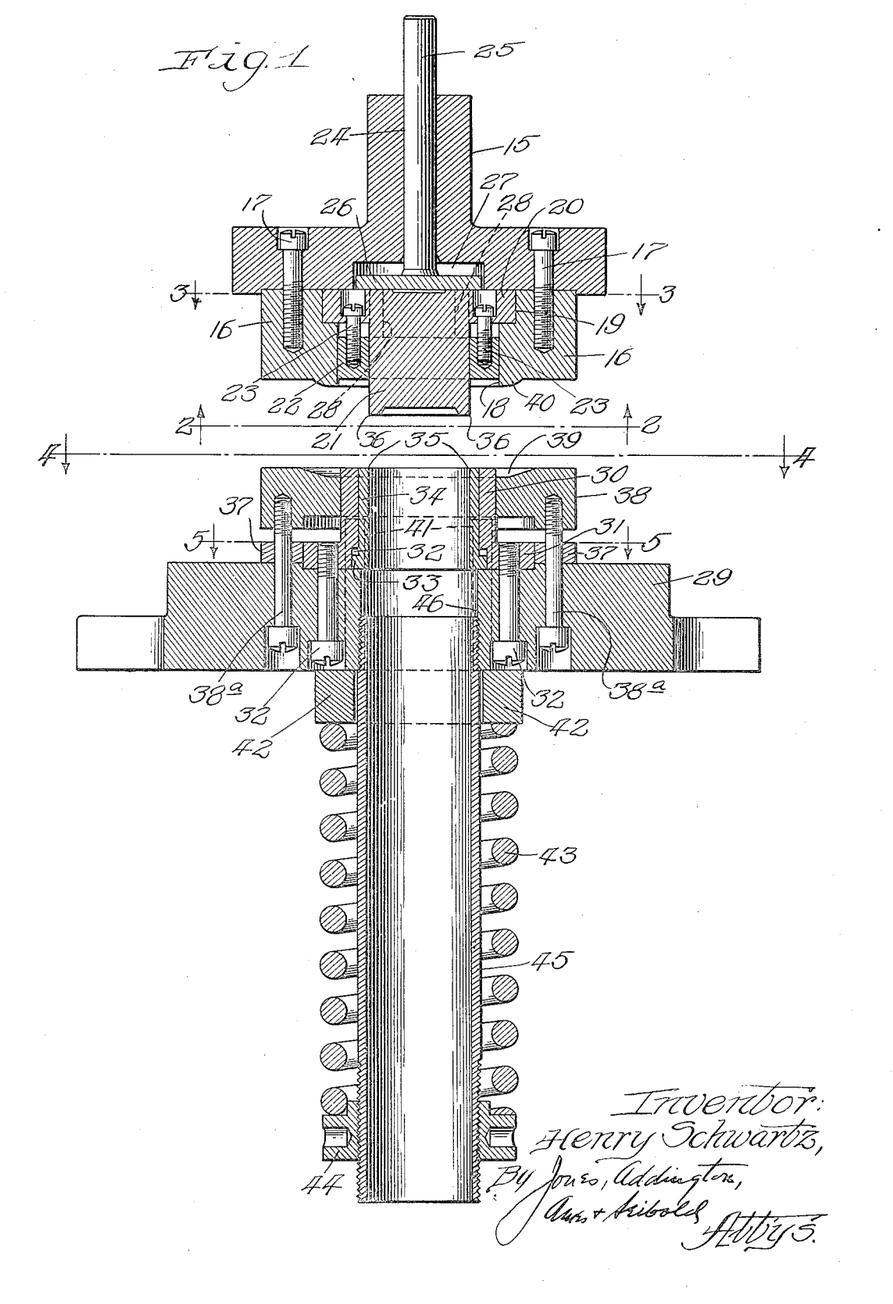
Figure 1 is a central sectional view of the punch and die mechanism arranged in an operative position.
Figure 2:
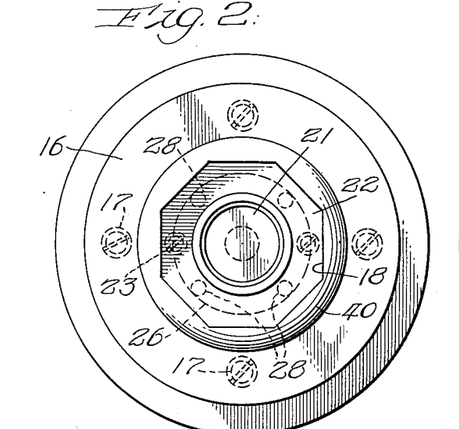
Fig. 2 is a bottom plan view of the punch mechanism taken on the line 2—2 of Fig. 1.
Figure 3:
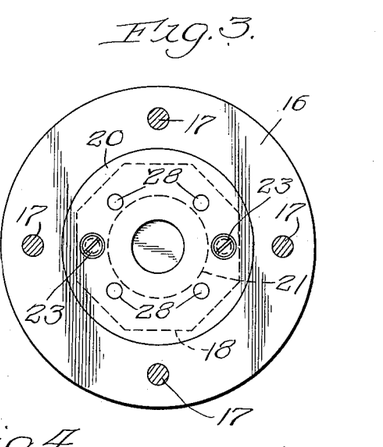
Fig. 3 is a top plan sectional view taken on the line 3—3 of Fig. 1.
Figure 4:
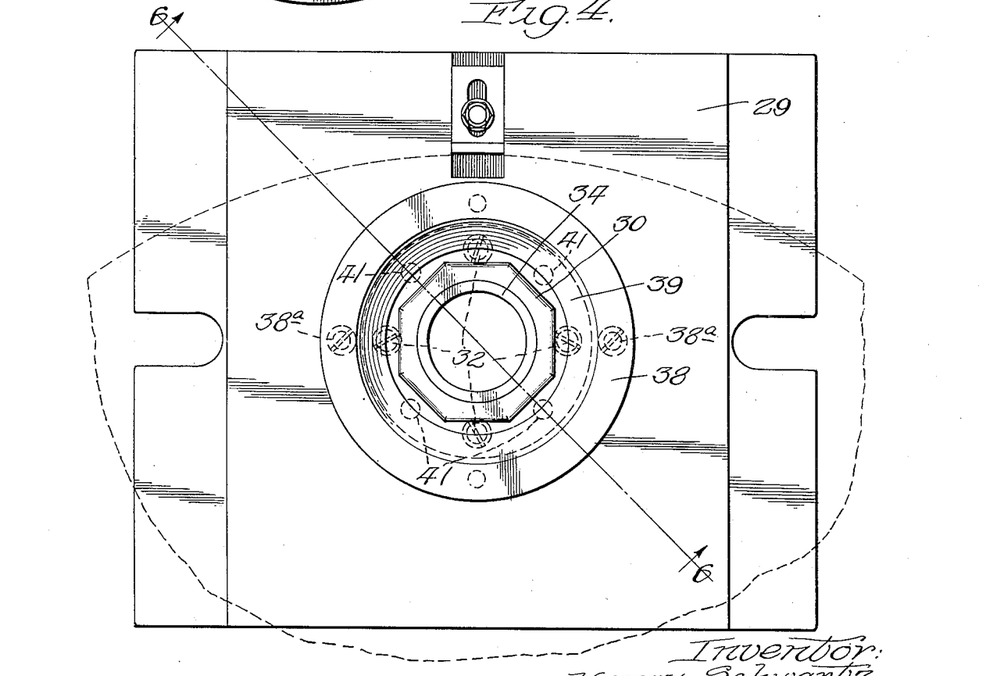
Fig. 4 is a top plan view of the die mechanism on the line 4—4 of Fig. 1.
Figure 5:
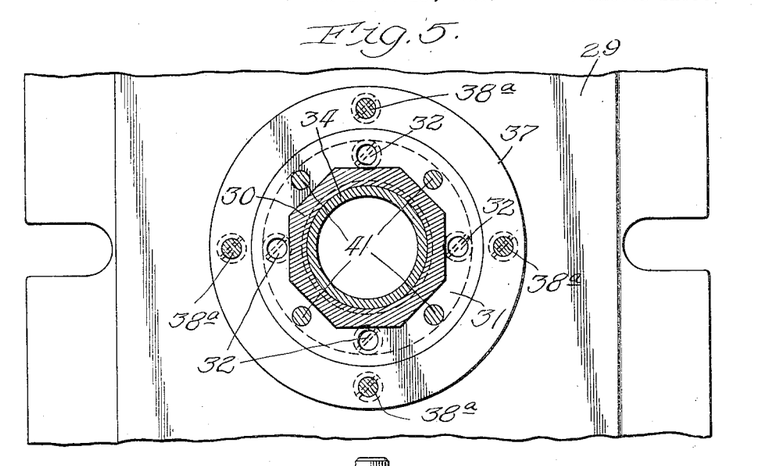
Fig. 5 is a sectional view of the die mechanism taken on the line 5—5 of Fig. 1.

The punch holder 15 is provided with a central aperture 24 for receiving a stem 25 in slidable relation therewith, a plunger 26 being fixed to the end of the stem 25 and being disposed in a recess 27 formed at the lower surface of the enlarged head of the punch holder. The plunger 26 normally rests on the head 20 of the cutter 21 and engages pins 28 which extend through the head 20 of cutter 21 and which pins in turn engage the upper surfaces of the knock-out ring 22.

Figure 6:
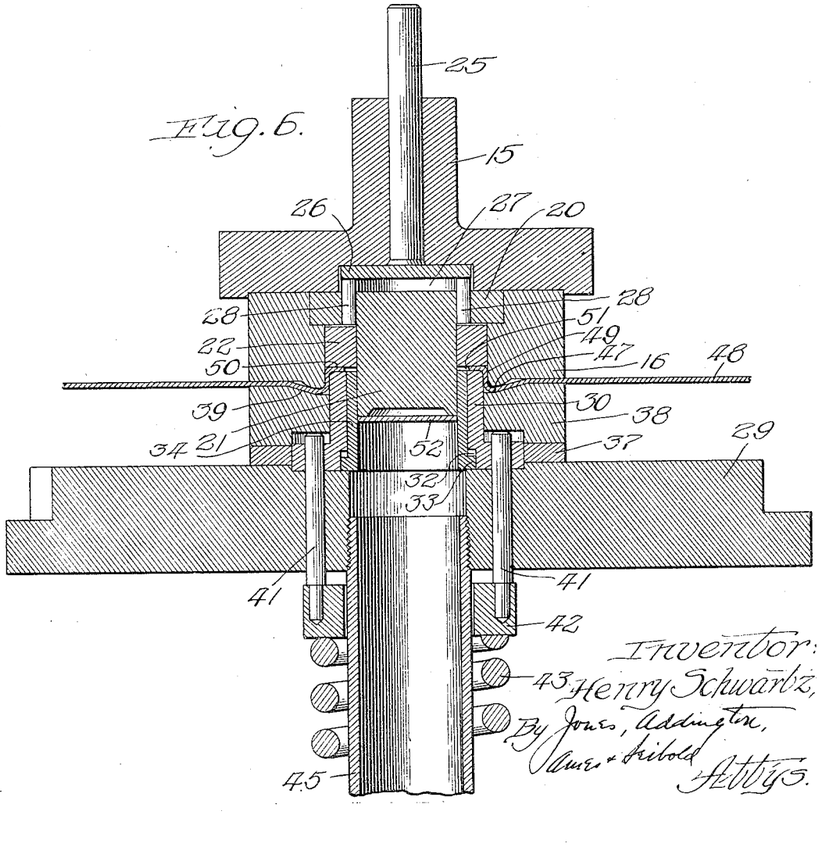
Fig. 6 is a vertical central sectional view taken on the line 6—6 of Fig. 4.

In the operation of the movable parts of the punch member, their relation being hereinafter more fully described with reference to the die mechanism, a movement upwardly of the knock-out ring 22 will cause the pins 28 to move upwardly to raise the plunger 26 in the recess 27 which position is clearly shown in Fig. 6. Conversely, when the stem 25 is moved downwardly, the plunger 26 contacting with the pins 28 force the latter downwardly to move the knock-out ring 22 to a lowered position which position is clearly illustrated in Fig. 1. The punch holder 15 is preferably made of machine steel and the punch 16 is preferably formed of a hardened tool steel as may also the cutter 21. This is noted merely for the purpose of minimizing the cost of construction and obtaining a maximum of durability of the punch member, it being apparent that these various members may be made of various materials which those skilled in the art may find the most effective.

The die mechanism comprises a shoe 29 for supporting a collar 30, the latter having a flange 31 on the lower end thereof which is seated in a recess in the upper surface of the shoe 29 and is held in position thereon by means of bolts 32. The outer periphery of the collar member 30 is preferably octagonal in shape, although it is to be understood that the periphery may have any desirable contour for reasons which will hereinafter be more clearly apparent.

The inner periphery of the collar 30 is preferably annular and has an enlarged portion 32 at the lower end thereof to receive in snug engagement therewith a flange 33 of a second collar member 34. It will be noted that the recess 32 of the collar 30 is of a greater height than the flange 33 in order that the collar 34 may be adjustable longitudinally of the collar 30. The edge 35 of the collar 34 acts as a cutting edge cooperating with the edge 36 of the cutter 21. As the edge 35 wears after its use in practice, the collar 34 may be removed and the edge ground, whereafter it may be replaced and a shim inserted between the lower edge of the flange 33 and the recess in the shoe 29 to raise the cutting edge to the proper height. The collar 30 is securely positioned on the shoe 29 by means of a centering ring 37 snugly engaging the flange 31 thereof and fastened to the shoe.

A die 38 is mounted on the collar 30 and has slidable engagement therewith vertically thereof, screws 38a limiting the upward movement of the die. The upper surface of the die 38 has a recessed portion 39 which cooperates with a projecting portion 40 on the lower surface of the punch 16 to form a corrugated or an annular beaded portion 47 in the work 48 inserted between the punch and die members which will hereinafter be more fully explained. The die 38 is held normally in an "up" position by means of pins 41 extending through the shoe 29 and flange 31 of the collar 30, the upper end of the pins 41 engaging a recessed portion in the die 38 and the lower ends thereof engaging a knock-out ring 42 held against the lower surface of the shoe 29 by means of a coil spring 43. The compression spring 43 is held in a compressed relation by means of an adjustable collar 44 threadedly engaging the lower end of a conduit 45 which latter is in turn secured at the upper end thereof in an internally threaded aperture 46 centrally disposed in the shoe 29. The inner diameters of the conduit 45 and the aperture 46 are slightly greater than the inner diameter of the collar 34 in order to permit of a free passage of the knock-out portions of the work therethrough.

In the operation of the punch and die mechanism just described, the shoe 29 is stationary, being fixed to a stationary plate of a punch press and the punch 16 is movable relative thereto in a vertical direction, being secured to the reciprocating members of the punch press. When the punch 16 moves downwardly the cutting edge 36 thereof cooperates with the cutting edge 35 of the collar 34 to form a preferably annular hole in the work which in this particular instance is a barrel head. In continuing the movement downwardly, the projecting portion 40 of the punch 16 cooperates with the recessed portion 39 of the die 38 to form a substantially annular corrugation or beaded portion 47 in the barrel head 48 in order to provide an excess of material surrounding the collar portion 49 whereupon when the collar 49 is subsequently formed against the sides of the bushing 79, as will hereinafter be described, the collar may engage the bushing snugly without causing the material immediately adjacent to the bushing 49 to be drawn appreciably thinner or to become disrupted or fractured thus weakening the holding power of the collar and supporting wall upon the bushing 79. The beaded or excess material portion 47 is formed at the same time as a collar portion 49 is formed in the barrel head. This operation may properly be defined as a drawing operation and the metal is drawn into the shape as illustrated in Fig. 6. In this position, it will be noted that the knock-out ring 22 is forced into engagement with the flange 20 of the cutter 21 and bears against a flange 50 on the collar 49, the flange being pressed against the upper end of the collar 30. It will be noted further that the die 38 has been forced downwardly against the pressure of the compression spring 43 by means of the pins 41 and the knock-out collar 42 to rest on the annular ring 37 thereby providing a rigid support on which the corrugation 47 is formed by means of the die 16 pressing thereagainst. It will be noted also that the diameter of the aperture 51 is considerably greater than the diameter of the knock-out portion 52 and that the material employed in the organization of the collar 49 has been taken from adjacent the aperture whereby any fracturing of the material of the barrel head 48 will be obviated. It will be noted further that no sharp bands are formed by this punch and die mechanism and that curves of substantially great radii are employed where a bend in the material is formed, likewise obviating fractures of the material.

The knock-out ring 22 being seated against the flange 20 of the cutter 21 moves the pins 28 upwardly to force the plunger 26 upwardly therewith. After the completion of the operation of forming the socket in the barrel head 48 which socket comprises the collar 49 for a flange 50 extending therefrom the punch and die members are supported and, as is usual in all punch and die mechanisms, the work formed may stick to the forming portions of the mechanism, and, therefore, the knock-out rings 22 and 42 are provided in these respective structures to expel the work therefrom, the knock-out ring 22 exerting a force against the flange 50 to expel the socket from the recess 18 of the punch 16 and the ring 42 by reason of the compression spring 43, urges the pins 41 against the die 38 to force the latter upwardly to force the socket out of engagement with the collar 30. The knock-out ring 22 is actuated by means of the stem 25 of the plunger 28, the stem 25 receiving a sharp punch from a member on the punch press which cooperates therewith just prior to the punch obtaining the limit of its upward movement. The member referred to is not shown in the drawings and may be of any character sufficient to move the stem 25 of the plunger 26 downwardly with a sufficient force.

Referring now more particularly to Figs. 7 to 12, inclusive, another punch and die mechanism is illustrated therein comprising a punch holder 53 preferably formed of machine steel having a plate member 54 secured to the underneath side thereof, the latter being preferably formed of a tool hardened steel. It will be apparent, of course, that these members may be formed in a single piece, although it is preferable to have the working surface thereof of a material having greater wearing characteristics than the remaining portion of the punch. A recess 55 is disposed in the lower surface of the punch plate 54 and is located substantially co-axial with the punch plate 54 and punch holder 53. An aperture 56 extends from the recess 55 upwardly through the punch holder and is co-axial therewith. This aperture 56 is adapted for use as a centering means for aligning the punch and the die.

Figure 7:
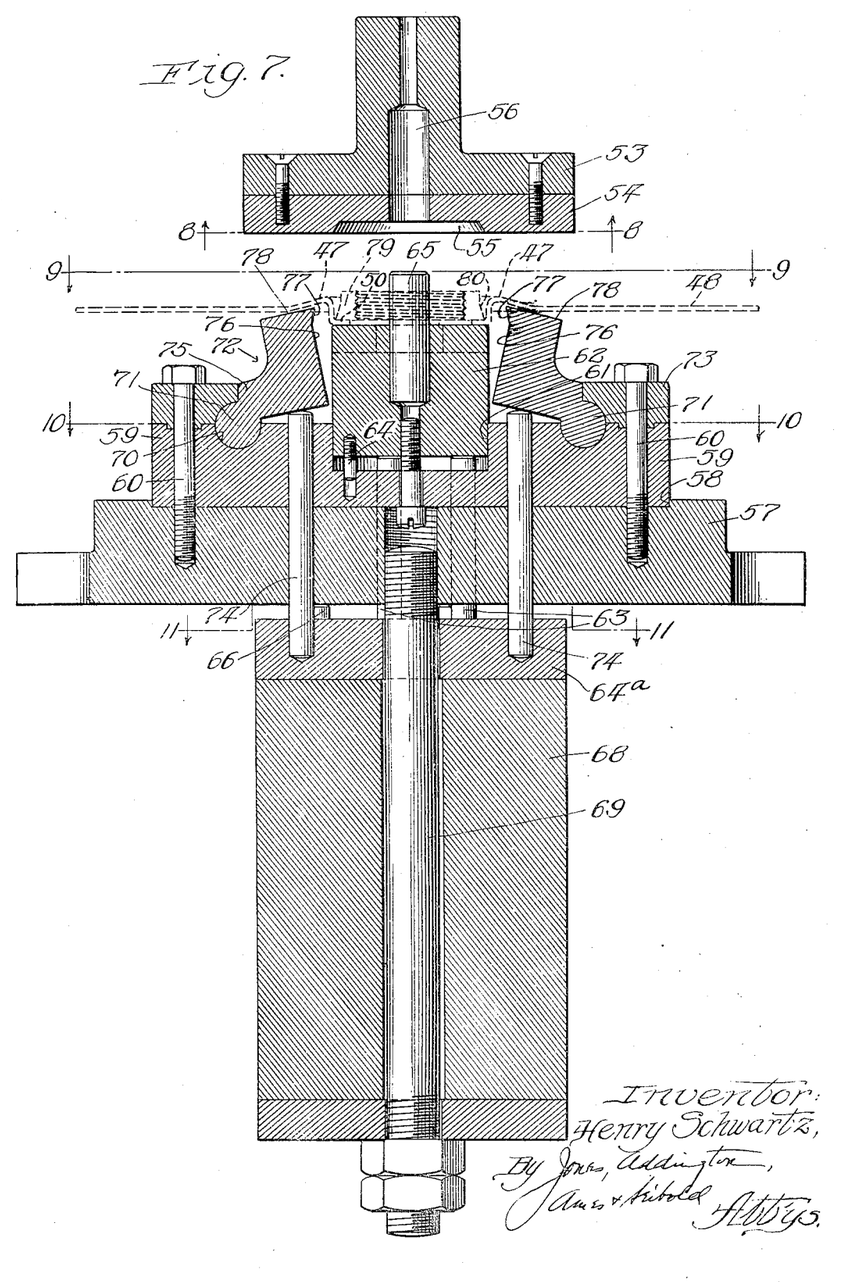
Fig. 7 is a vertical central sectional view of another punch and die mechanism for operation on the work produced by the punch and die mechanism illustrated in the previously described figures.
Figure 8:
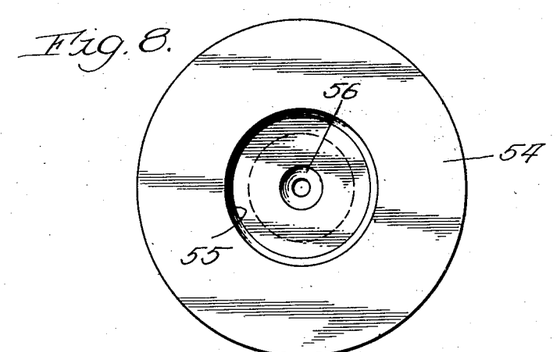
Fig. 8 is a bottom plan view of the punch mechanism taken on the line 8—8 of Fig. 7.

The die mechanism comprises a shoe 57 which may be suitably secured to the table of a punch press and has a recess 58 on the upper surface thereof for receiving a detachable supporting portion 59, the latter being secured to the shoe by means of bolts 60. The supporting portion 59 has a central recess 61 for receiving a plunger 62, the latter resting on the upper end of a plurality of pin members 63. The plunger 62 is held against rotation by means of a pin 64 fixed to the plunger and entering an aperture in the supporting portion 59. The plunger 62 has slidable engagement in the recess 61 vertically thereof. In order to align the punch and the die, a rod 65 is mounted in the plunger 62 and extends upwardly therefrom to engage the aperture 56 of the punch 53.

The supporting pins 63 of the plunger 62 extend through the shoe 57 and supporting portion 59 and engage the upper surface of a knock-out plate 64a, the latter being limited in its upward movement by the bottom surface 67 of the shoe 57, pins 66 fastened in the plate 64 acting as spacers to establish a predetermined distance therebetween. The knock-out plate 64a is urged upwardly by reason of a resilient means such as a block of compression rubber 68 supported by a rod 69 which latter threadedly engages an internally threaded aperture in the shoe 57.

The upper surface of the detachable supporting portion 59 is provided with an annular recess 70 of a semi-circular cross-section for receiving the bearing portion 71 of a plurality of segmental jaw members 72. A retaining ring 73 is disposed on the upper surface of the supporting portion 59 and is held in position thereon by means of the bolts 60, the latter being, as hereinbefore recited, the securing means for the supporting portion. The retaining ring 73 has a cooperating arcuate surface for engaging the upper part of the bearing portion 71, the engaging surfaces of both the retaining ring 73 and the supporting portion 59 extending a substantial distance beyond a diametrically opposite point on the bearing portion 71 for retaining the segmental jaw member 72 in position.

Figure 14:
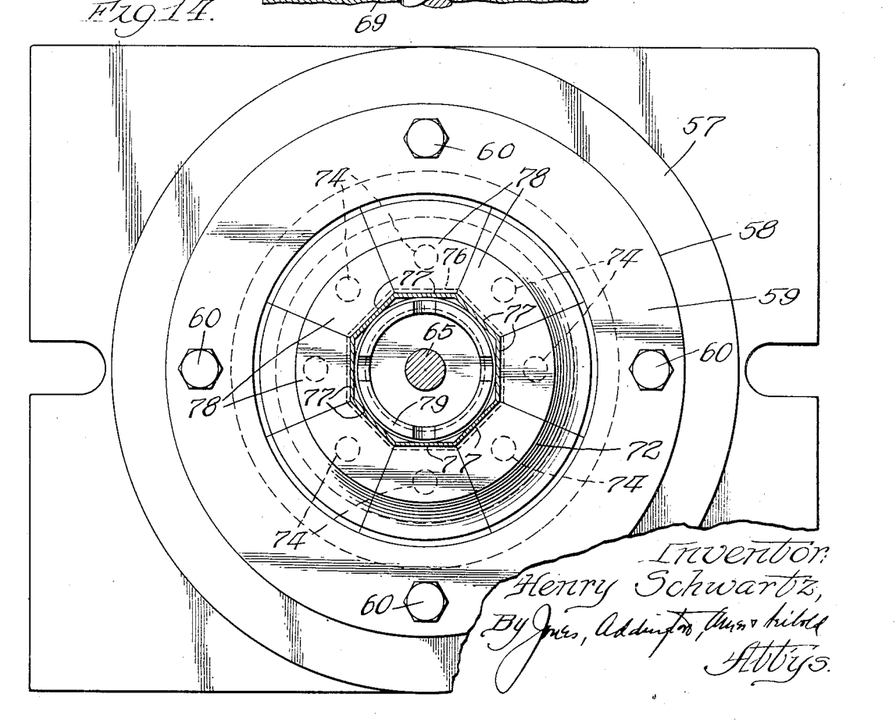
Fig. 14 is a plan sectional view taken on the line 14—14 of Fig. 13.

As shown in Fig. 7, the segmental jaw members are normally held in an "up" position by means of a plurality of pins 74 which are mounted in the knock-out ring 64 and extend through the shoe 57 and the detachable supporting portion 59 to engage the bottom of the segmental jaw members. A shoulder 75 projecting upwardly from the bearing portion 71 limits the movement of the segmental jaw members 72 in the upper position thereof. By referring now to Fig. 14 of the drawings, it will be noted that the members 72, when viewed from the top thereof, form segments of a circle. However, their engaging faces 76 are straight and because of the number of jaw members illustrated, form an internal perimeter of an octagonal shape.

Figure 13:
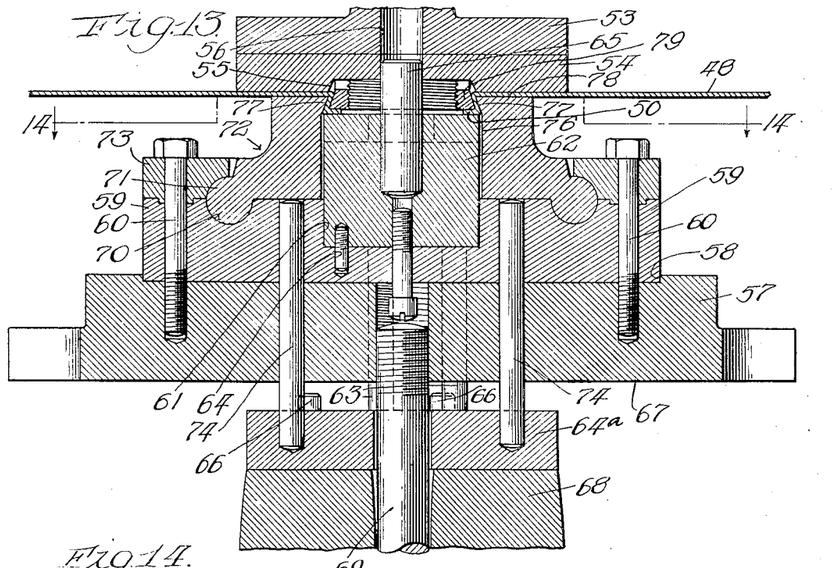
Fig. 13 is a view similar to Fig. 7 showing a changed position thereof.

Each of the segmental jaw members is provided with an engaging finger 77 extending outwardly from the engaging face 76 and forming an acute angle with the top surface 78. The outer periphery of the plunger 62 conforms in size and shape to the engaging surfaces 76 of the jaw members and is, therefore, preferably octagonal. When the plunger is in an "up" position, the finger 77 lies in a plane above the upper surface of the plunger which, of course, is true also when the plunger is in a lowered position as is shown more particularly in Fig. 13 of the drawings, and will hereinafter be more clearly apparent when the operation of the punch and die members is more fully described.

In the operation of the punch and the die, the socket portion of the barrel head 48 is placed therebetween, the flange 50 resting on the upper surface of the plunger 62. The lower surface of the plate member 54 will then engage the annular beaded portion or corrugation 47 to move the same downwardly, whereafter the upper ends of the segmental jaw member 72 will be forced downwardly and inwardly, the barrel portion being engaged between the member 54 and the upper end surface 78. In moving inwardly, the fingers 77 engage the side walls 49 of the socket and squeeze or direct the same inwardly against the sides of the bushing 79. In the downward travel of the punch and the downward and inward travel of the segmental jaw members, the plunger 62 is likewise forced downwardly by reason of the engagement of the upper end of the bushing 79 with the lower surface of the recessed portion 56. By reason of the pins 74 and 63 engaging the knock-out plate 64, the compression means 68 are depressed to permit of such movement. The material of the annular beaded portion 47 is taken up in the movement of the collar 49 to engage the upwardly converging sides 80 of the bushing. By reason of the allowance of this excess of material such as the beaded portion 47, a subsequent formation of the collar 49 against the sides of the bushing 79 will not produce a fracture of the material at the point of bend nor will it cause the material to be drawn appreciably thinner at or adjacent to the bend. The position of the operable members of this punch and die construction at the downward limit of the punch is shown quite clearly in Fig. 13 of the drawings.

Figure 9:
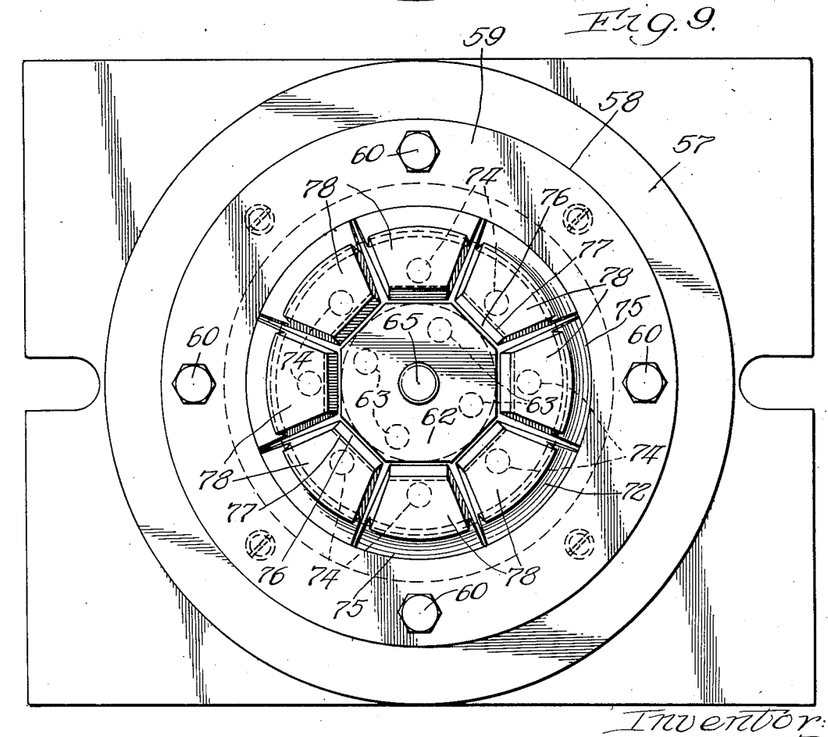
Fig. 9 is a top plan elevational view of the die mechanism taken on the line 9—9 of Fig. 7.
Figure 10:
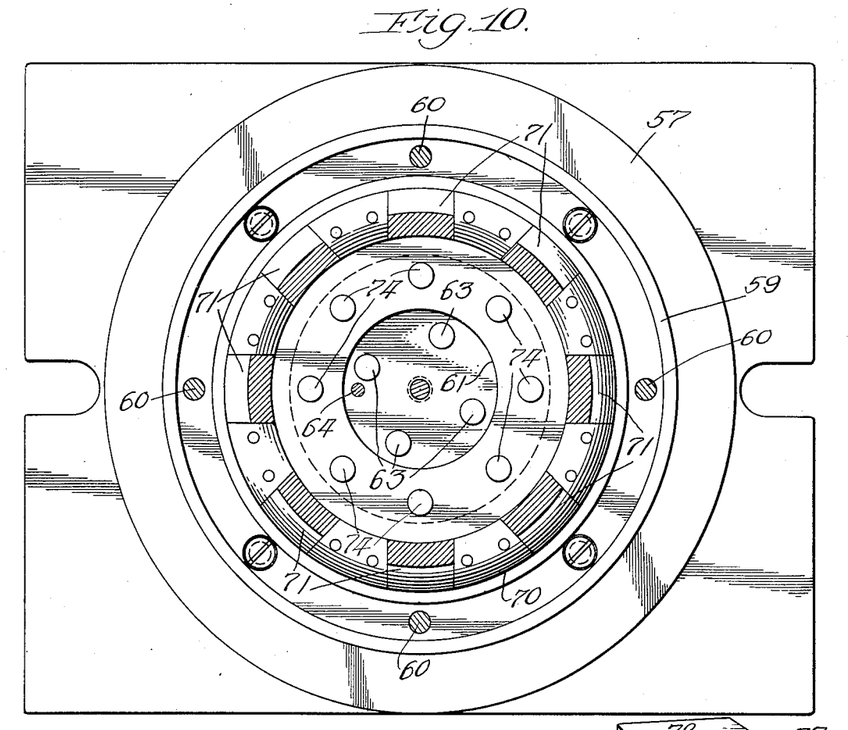
Fig. 10 is a top plan sectional view taken on the line 10—10 of Fig. 7.
Figure 11:
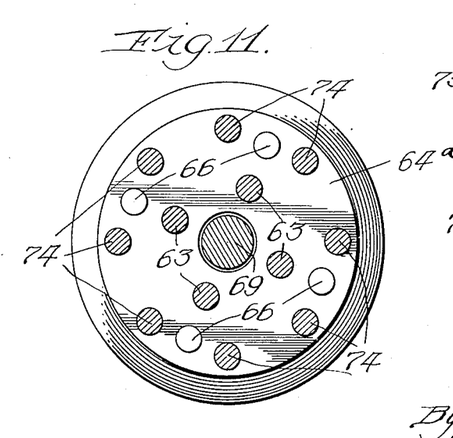
Fig. 11 is a sectional view taken on the line 11—11 of Fig. 7.
Figure 12:
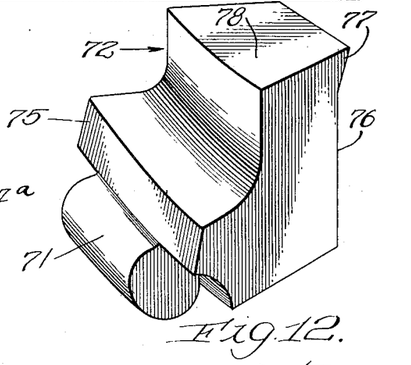
Fig. 12 is a perspective view of one of the segmental jaw members.

When the punch is raised, the segmental jaw members 72 are pivoted back to their original positions as shown in Figs. 7 and 9 by reason of the compression means exerting a force against the pins 74. Likewise, the plunger 62 is urged upwardly by reason of the compression means 68 forcing the pins 63 upwardly. The bushing structure is then in a completed form and is expelled from the apparatus.

While but a single embodiment of this invention is herein shown and described, it is to be understood that various modifications thereof may be apparent to those skilled in the art without departing from the spirit and scope of this invention, and therefore, the same is to be limited only by the scope of the prior art and the appended claims.

I claim:

1. An apparatus for operating on a socket formed in a sheet metal wall to force the sides of said socket into engagement with a bushing having upwardly converging sides and seating in said socket said apparatus comprising a plurality of pivotally mounted segmental jaw members spaced equi-distantly from the central axis of said socket, and means for operating said jaw members, said jaw members having socket engaging faces extending upwardly and inwardly toward said central axis.

2. An apparatus for forming a bushing structure comprising a supporting member having a central recess, a core portion disposed in said recess and vertically slidable therein, a plurality of pivotally mounted jaw members equi-distantly spaced from the central axis of said core portion, and means for operating said jaw members, said jaw members having engaging faces extending upwardly and inwardly toward the central axis of said core portion.

3. An apparatus for forming a bushing structure comprising a supporting member having a central recess, a core portion disposed in said recess and vertically slidable therein, a plurality of segmental jaw members pivotally mounted on said supporting member and equi-distantly spaced from the central axis of said core portion, and means for operating said jaw members, said jaw members having engaging faces extending upwardly and inwardly toward the central axis of said core portion.

4. An apparatus for operating on a socket formed in a sheet metal wall to force the sides of said socket into engagement with a bushing having upwardly converging edges and seating in said socket, said apparatus comprising a plurality of pivotally mounted segmental jaw members spaced equi-distantly from the central axis of said socket, means for operating said jaw members, said jaw members having socket engaging faces extending upwardly and inwardly toward said central axis, and resilient means for holding said jaw members in a normally inoperative position.

5. An apparatus for forming a bushing structure comprising a supporting member having a central recess, a core portion disposed in said recess and vertically slidable therein, a plurality of segmental jaw members pivotally mounted on said supporting member and equi-distantly spaced from the central axis of said core portion, means for operating said jaw members, said jaw members having engaging faces extending upwardly and inwardly toward the central axis of said core portion, and resilient means for holding said jaw members and said core portion in a normally inoperative position.

6. An apparatus for forming a bushing structure comprising a punch and a die, said die comprising a supporting member having a central recess, a core portion vertically slidable in said recess, and a plurality of pivotally mounted jaw members spaced equi-distantly from the central axis of said supporting portion, said jaw members having engaging faces extending upwardly and inwardly toward said central axis, said punch member exerting a pressure upon the upper portion of and for operating said jaw members.

7. An apparatus for operating on a socket and an annular bead formed in a sheet metal wall to force the sides of said socket inwardly into engagement with a bushing having upwardly converging sides and resting in said socket, said apparatus comprising a plurality of movable segmental jaw members arranged circumferentially about the axis of said socket and acting in the angle between the sides of said socket and said wall, and means for operating said jaw members to iron out said annular bead and to force the sides of said socket inwardly to snugly engage said bushing.

8. An apparatus for forming a bushing structure comprising a punch and a die, said die comprising a supporting member, a core portion resiliently supported thereon for engaging the base of a socket formed in a sheet metal wall, and segmental jaw members arranged circumferentially about the axis of said socket, said wall having a beaded portion adjacent said socket and resting on the upper portion of said jaw members, said jaw members acting in the angle between the sides of said socket and said wall, said punch exerting a pressure against said wall and said jaw members to iron out said annular bead and to force the sides of said socket inwardly to snugly engage upwardly converging edges of a bushing disposed therein.

9. An apparatus for forming a bushing structure comprising a punch and a die, said die comprising a supporting member, a core portion resiliently supported thereon for engaging the bottom of a socket formed in a sheet metal wall, and segmental jaw members pivotally mounted on said supporting member and spaced equi-distantly from the central axis of said socket, said jaw members having engaging faces extending upwardly and inwardly toward said central axis, and acting in the angle between the sides of said socket and said wall, said wall having an annular bead adjacent said socket portion and resting on the upper flat surface of said jaw members, said punch exerting a pressure against said wall and said jaw members to force the sides of said socket inwardly to snugly embrace upwardly converging edges of a bushing disposed therein whereby said beaded portion is flattened and the material thereof used up in the walls of the socket.

10. An apparatus for forming a bushing structure comprising a supporting member having a central recess, a core portion disposed in said recess and vertically slidable therein, a plurality of pivotally mounted jaw members equi-distantly spaced from the central axis of said core portion, means for operating said jaw members out of a normal inoperative position, said jaw members having faces extending upwardly and inwardly toward said central axis, means on said supporting member engaging said jaw members and said core portion, and resilient means for actuating said engaging means for returning said jaw members and said core portion to a normally inoperative position.

11. An apparatus for forming the material of a socket in a sheet metal wall into a securing relation with the edges of a bushing comprising a punch and a die, said die having a supporting portion for engaging the outer surface of said socket and a second supporting portion for engaging said wall, said wall having an excess of material adjacent to said socket, said punch member having an engaging face for cooperating with said second supporting portion and for exerting a pressure thereupon to use up said excess of material.

HENRY SCHWARTZ.